US005486950A

United States Patent [19]

Collinge

[11] Patent Number: 5,486,950

[45] Date of Patent: Jan. 23, 1996

[54] PHASE CORRECTING ZONE PLATE

[75] Inventor: Gary Collinge, Suffolk, United Kingdom

[73] Assignee: Flat Antenna Company Limited, United Kingdom

[21] Appl. No.: 39,860

[22] Filed: Mar. 30, 1993

[30] Foreign Application Priority Data

Jul. 9, 1992 [GB] United Kingdom .................. 9214562

[51] Int. Cl.[6] .................................................. G02B 27/44

[52] U.S. Cl. .......................... 359/565; 359/569; 359/572; 359/575; 359/742; 343/753; 343/909; 343/910; 343/911 R

[58] Field of Search .................................... 359/558, 565, 359/569, 572, 575, 742; 343/753, 909, 910, 911 R, 914; 378/70, 84; 430/323

[56] References Cited

U.S. PATENT DOCUMENTS

| | | | |
|---|---|---|---|
| 3,189,907 | 6/1965 | Van Buskirk | 343/753 |
| 5,073,007 | 12/1991 | Kedmi et al. | 359/565 |
| 5,151,823 | 9/1992 | Chen | 359/742 |
| 5,161,059 | 11/1992 | Swanson et al. | 359/565 |
| 5,278,028 | 1/1994 | Hadimioglu et al. | 359/565 |

FOREIGN PATENT DOCUMENTS

| | | | |
|---|---|---|---|
| 0373755 | 4/1923 | Germany | 359/742 |
| 0221072 | 7/1968 | U.S.S.R. | 359/565 |
| WO92/01319 | 1/1992 | WIPO | H01Q 19/06 |

OTHER PUBLICATIONS

Tudorovskii, "An Objective with Phase Plate", *Optics and Spectroscopy,* Feb. 1959, pp. 126–133.

*Primary Examiner*—Ricky D. Shafer
*Assistant Examiner*—John Juba, Jr.
*Attorney, Agent, or Firm*—Westman, Champlin & Kelly

[57] ABSTRACT

A zone plate focusing radiation comprises a plurality of surface portions (20*a*, 20*b*, 20*c*, 20*d*, 30) corresponding to zones of the zone plate. The surface portions are positioned in a plurality P of parallel planes such that each surface portion diffracts radiation out of phase with respect to adjacent surface portions such that radiation diffracted by the surface portion constructively interferes at a focus of the zone plate. The $p^{th}$ plane is dielectrically spaced from the first plane by $n\lambda$, where $\lambda$ is the wavelength of the radiation and n is an integer.

18 Claims, 6 Drawing Sheets

PHASE CORRECTING ZONE PLATE

The present invention relates to a phase correcting zone plate for focusing radiation.

The use of zone plates for focusing radiation such as microwaves is well known. One type of zone plate disclosed in "Millimetre-Wave Characteristics of Phase Correcting Fresnel Zone Plates" by D. N. Black and J. Wiltse, IEEE Transactions on Microwave Theory and Techniques, Volume 35, No. 12 (1987) Pages 1122–1128, is the Phase Correcting Fresnel Zone Plate. Such a zone plate is shown schematically in FIG. 1 for quarter wave correction, although a phase correcting zone plate can be made for any wavelength fraction. The radius of each zone $r_N$ can be given by $$r_N = \frac{(2Nf\lambda}{L} - (N\lambda/L)^2)^{1/2}$$

where N is the zone number, f is the focal length of the zone plate, λ is the wavelength of the radiation, and L is an integer greater than 2. For quarter wave correction L=4. For such a zone plate both in and out of focus zones contribute to the energy at the focus thus increasing the efficiency compared to a conventional blocking zone plate. The correction of the phase by the zones is achieved by changing the pathlength of the energy reflected from the zone for a reflection zone plate. This is equally applicable to a transmission zone plate acting as a Fresnel lens where the correction of the phase by the zones is achieved by changing the pathlength of the energy transmitted through that zone. In transmission the dielectric material is placed behind the zone surface whilst in reflection as shown in FIG. 1 the dielectric material is placed in front of the reflective zone surface. Thus the energy reflected from the zone 2*a* of the quarter wave zone plate of FIG. 1 would be out of phase with respect to the energy from the zone 3 by λ/4 at the focus, unless the path length was decreased or increased by λ/4. An increase in pathlength of λ/4 is achieved by providing steps λ/8 in depth in the reflection arrangement or λ/4 for transmission. Thus zone 2*a* is λ/8 higher than zone 3 and zone 2*b* and 2*c* are λ/4 and 3λ/8 higher than zone 3 respectively. More generally, the different phases of the zones of the zone plate are stepped by d where $$d=\lambda_0/2L$$

where $\lambda_0$ is the free space wavelength of the radiation. Thus the purpose of the zones is to impart a varying phase shift on the incoming signal such that the radiation diffracted by the zones to a focus is in phase.

In the prior art this has been achieved by quarter wave zone plates having zones which provide phase shifts of 0° and 360°, 90°, 180° and 270° as shown in FIG. 2.

It has however been found that when such a zone plate is used as a microwave antenna high side lobes were found distributed at intervals along the frequency response curve.

An object of the present invention is to provide a zone plate for focusing radiation wherein the radiation is efficiently brought to the focal point in phase.

In one aspect, the present invention provides a zone plate for focusing radiation comprising a plurality of surface portions corresponding to zones of said zone plate; said surface portions being positioned in a plurality P of parallel planes so that each surface portion diffracts radiation out of phase with respect to adjacent surface portions such that radiation diffracted by said surface portions constructively interferes at a focus of said zone plate; where the $p^{th}$ plane is dielectrically spaced from the first plane by nλ, where λ is the wavelength of the radiation and n is an integer.

Thus in this aspect of the present invention an extra layer is provided with zones to reflect radiation 360° out of phase in respect to the central zone, or some multiple n thereof. Preferably n=1 and thus the surface portions forming zones of the zone plate form a repeat pattern every complete wavelength zone.

In one embodiment of this aspect of the present invention said zone plate comprises a 1/L wave zone plate, where L is an integer greater than 2, wherein said surface portions are formed in P parallel planes where P=nL+1, and the width of the said surface portions provided in the first and $p^{th}$ planes is less than the width of the said surface portions in adjacent second or $(P-1)^{th}$ planes respectively, the total width of adjacent surface portions in the first and $p^{th}$ planes being equal to 1/L wave zone of said zone plate, said surface portions in the first to $(P-1)^{th}$ planes diffracting radiation λ/L out of phase with respect to adjacent surface portions in the second to $p^{th}$ planes respectively.

In such an arrangement preferably said surface portions in the first and $p^{th}$ planes having a width corresponding to a ½L wave zone.

In another embodiment of this aspect of the present invention said surface portions comprise primary and secondary surface portions. The or each said primary surface portions forming 1/L wave zones of said zone plate, where L is an integer greater than 2, and being positioned in one of P parallel planes dielectrically spaced by λ/2L, where P=nL+1, such that the or each primary surface portion in a plane diffracts radiation mλ/L out of phase with respect to any primary surface portion in another plane, where m is an integer, said secondary surface portions being positioned in said planes and in sub-planes between said planes, where said sub-planes are dielectrically spaced from each other and adjacent said planes by λ/2Lr, where r is an integer greater than 2, r secondary surface portions being provided adjacent one another such that each secondary surface portion diffracts radiation λ/Lr out of phase with respect to adjacent secondary surface portions, thus forming 1/Lr wave zones of said zone plate.

In one embodiment a group of r said secondary surface portions are positioned such that one is positioned in a plane, and one is positioned in each of (r−1) adjacent sub-planes.

In such an embodiment preferably there are no primary surface portions provided in the first plane, and secondary surface portions are provided in the first plane and each of (r−1) sub-planes between the first and second planes.

In another embodiment the secondary surface portions are provided near the centre of the zone plate.

In another aspect, the present invention provides a zone plate for focusing radiation comprising a plurality of surface portions corresponding to zones of said zone plate; said surface portions comprising primary and secondary surface portions; said primary surface portions being positioned in a plurality L of parallel planes so that each primary surface portion diffracts radiation mλ/L out of phase with respect to primary surface portions such that radiation diffracted by said surface portions constructively interferes at a focus of said zone plate, where m is an integer; said secondary surface portions being provided in at least the central zone of said zone plate in a said plane and sub-planes, wherein a plurality r of said secondary surface portions are provided adjacent one another such that each secondary surface portion diffracts radiation λ/Lr out of phase with respect to adjacent secondary surface portions, thus forming 1/Lr wave zones of said zone plate.

In one embodiment of this aspect of the present invention no primary surface portions are provided in the first plane, there being a secondary surface portion in the first plane and each of (r−1) sub-planes positioned on a side of the first plane distal from the second plane.

In one embodiment the zone plate of the present invention is a reflective zone plate and the surface portions are reflective, the planes being dielectrically separated by λ/2L and the sub-planes being dielectrically separated by λ/2Lr.

In another embodiment of the zone plate of the present invention, the surface portions are transmissive and the zone plate is formed of dielectric material through which the radiation passes to be focused; said planes being dielectrically separated by λ/2 and said sub-planes being dielectrically separated by λ/Lr. This arrangement forms a Fresnel lens type zone plate.

Conventionally, when radiation is incident on a zone plate and focused on-axis, the zones of the zone plate are circular. However, in one embodiment of the present invention where the zone plate is used for microwave applications, the incident radiation is not on-axis, and the surface portions following the zones of the zone plate describe ellipses to focus the radiation off-axis.

Examples of the present invention will now be described with reference to the accompanying drawings, in which.

Figure 1:
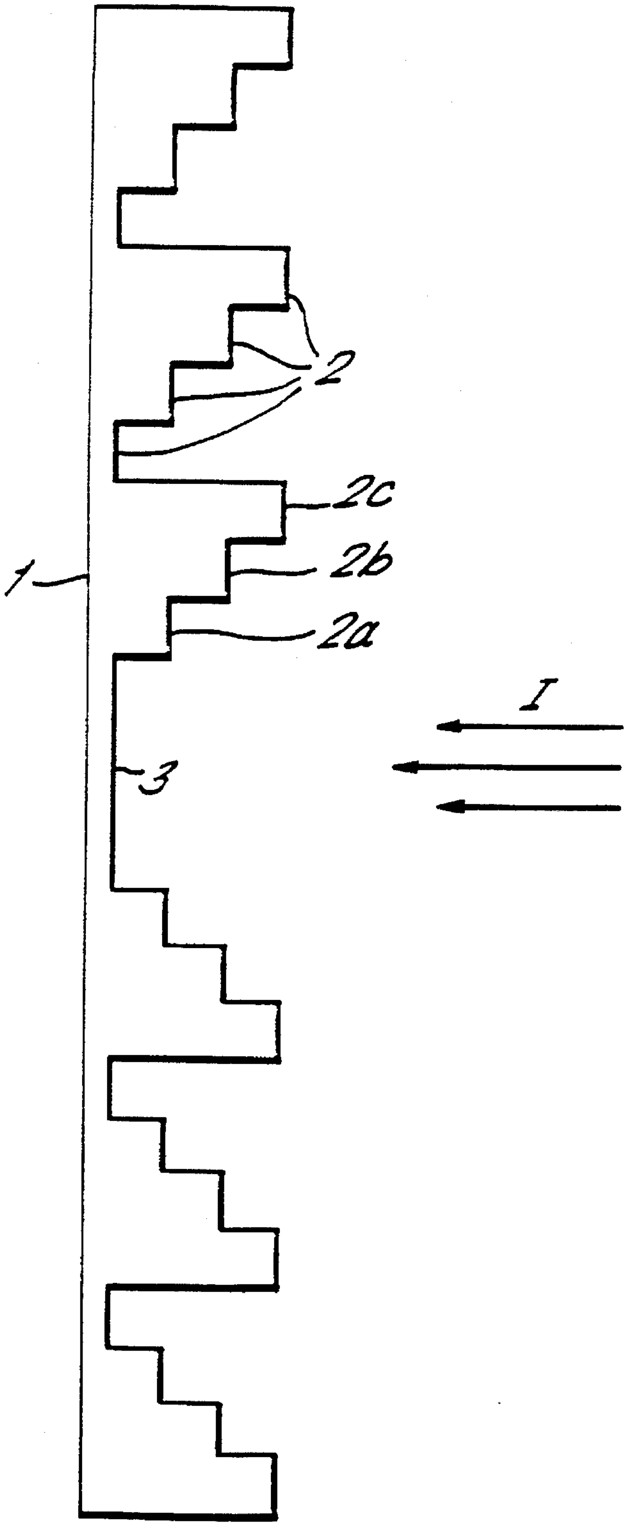
FIG. 1. PRIOR ART
FIG. 1 is a schematic illustration of a conventional reflective quarter wave zone plate.
Figure 2:
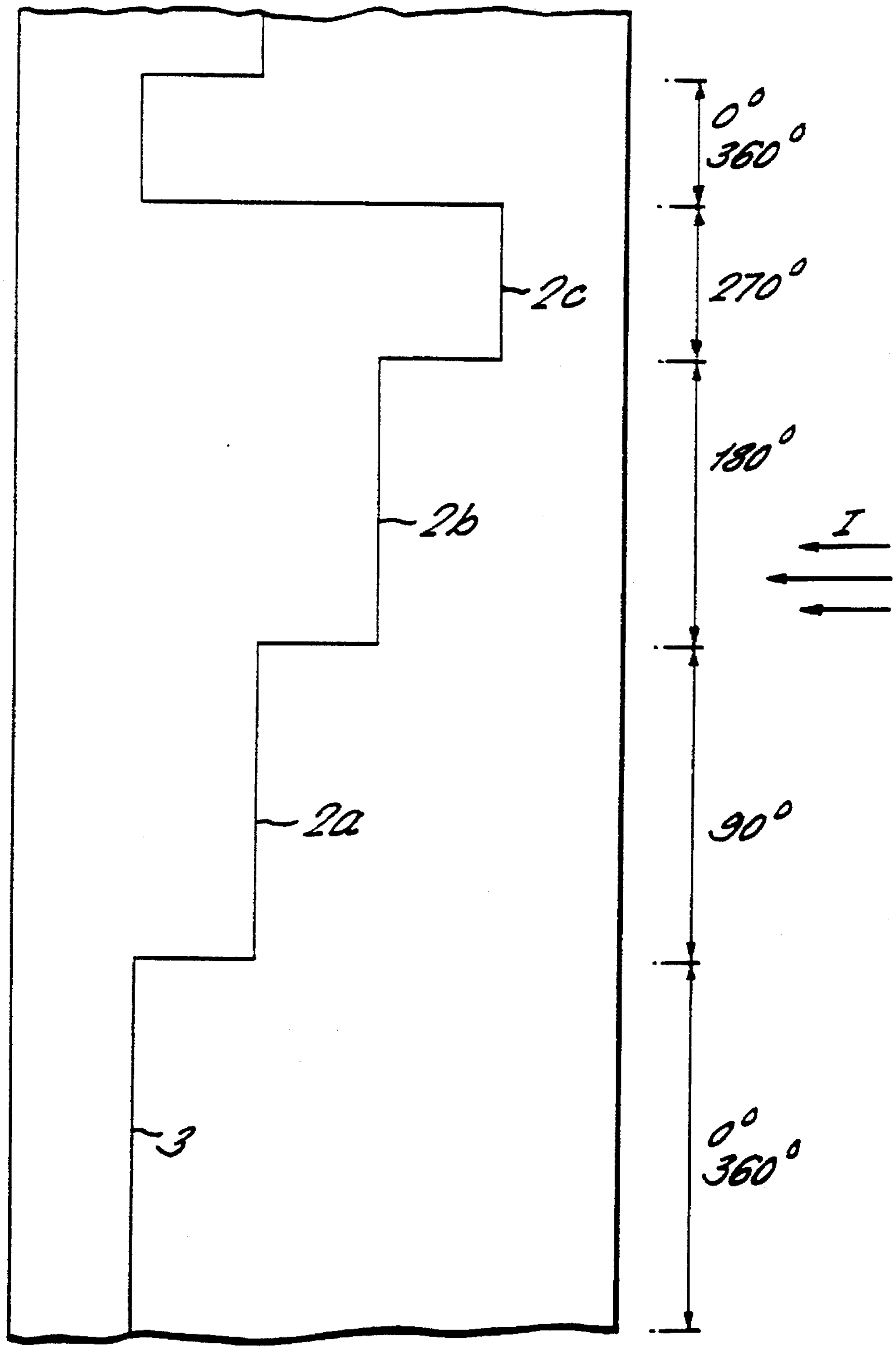
FIG. 2. PRIOR ART
FIG. 2 is a schematic illustration of the phase correction provided by the zones of the zone plate in FIG. 1.
Figure 3:
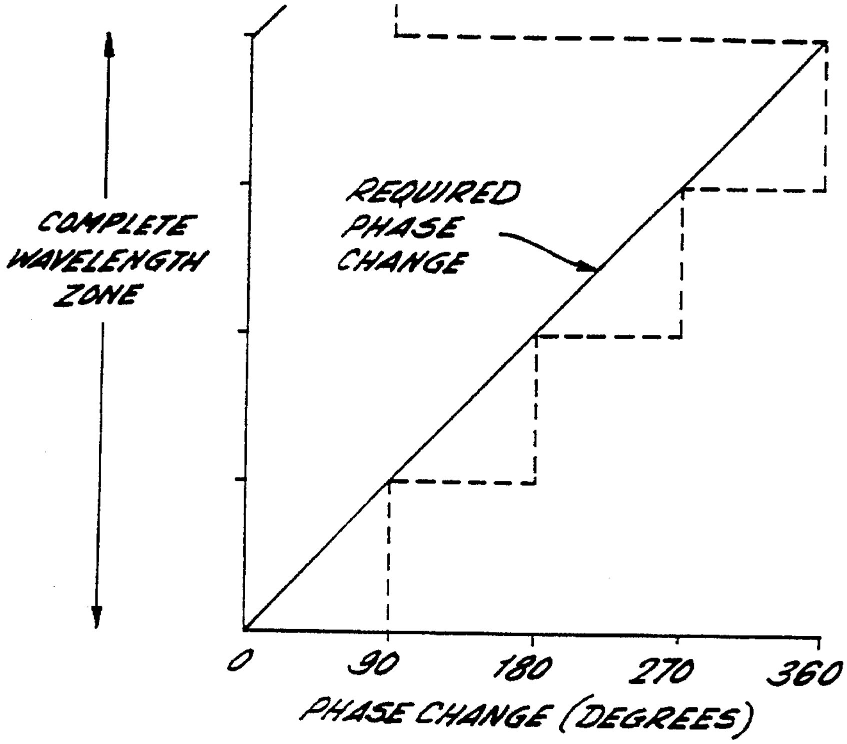
FIG. 3. PRIOR ART
FIG. 3 is a diagram of the required phase change and the phase change imparted by the quarter wave reflection zone plate shown in FIG. 1.

Referring now to the diagrams, FIG. 1 illustrates a prior art quarter wave reflection zone plate which, as illustrated in FIG. 2, provides for a phase change from the reflective surfaces 3, 2*a*, 2*b*, and 2*c* of 0°, 90°, 180° and 270° respectively. This is represented in a phase diagram in FIG. 3 together with the required phase change. FIG. 3 only illustrates the phase change required over one complete wavelength zone.

A conventional four layer zone plate such as that discussed above was tested as a microwave antenna at a frequency of 12 GHz it was found by the inventors of the present application that the zone plate's performance was lower than expected. When a plot of the frequency response was studied there were high side lobes distributed at intervals along the plot. It thus became clear that the total phase shift imparted by a prior art four layer zone plate was only 270° as is clear from FIG. 3.

In the four layer case it has been noted that the main problem lies in the rearmost layer and this has been resolved by either dividing this layer into sub-layers or providing this layer with only half the normal zone width, with the remaining width being provided as a front layer lying dielectrically one-half of a wavelength in front of the rear layer (for a reflective arrangement or one wavelength for a transmissive arrangement).

Figure 4:
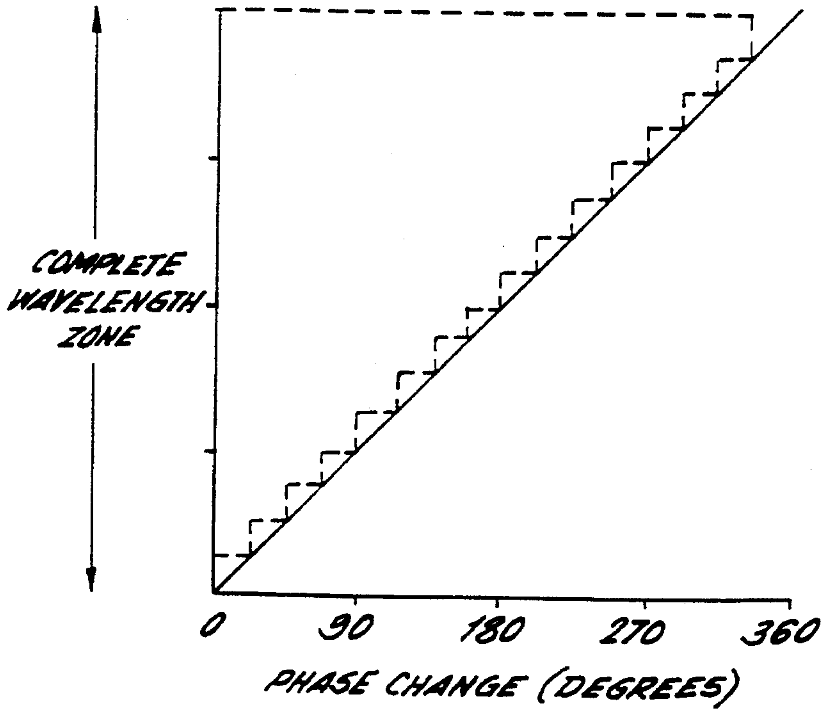
FIG. 4. PRIOR ART.
FIG. 4 illustrates the required phase change and the phase change imparted on the radiation by a 16th wave zone plate over one wavelength zone.

FIG. 4 illustrates that for the conventional 16th wave zone plate the phase error is much smaller. However, even for this case the phase error can be reduced using the principles of the present invention.

Figure 5:
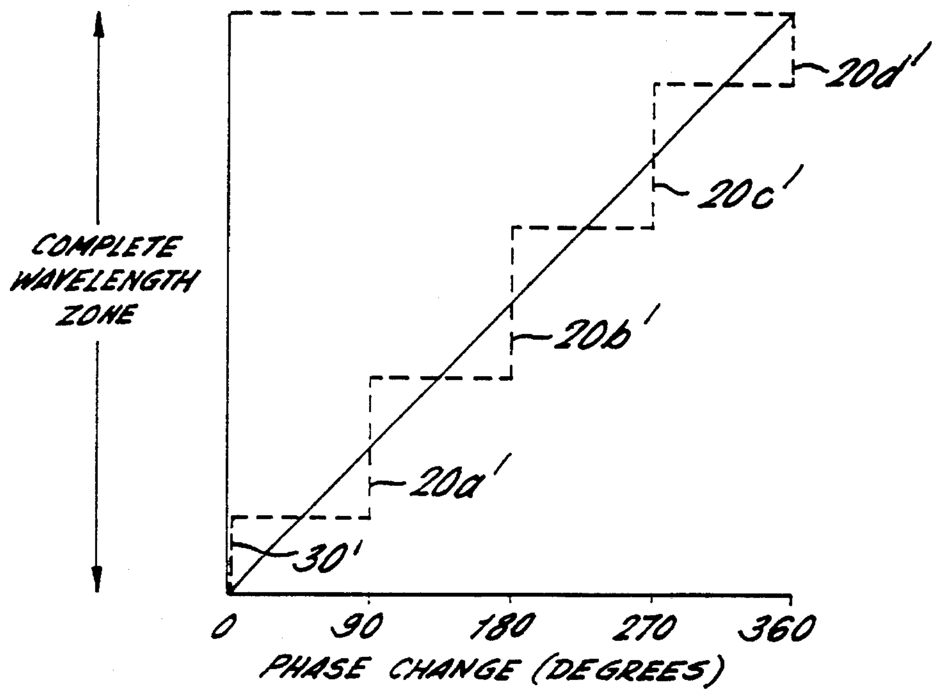
FIG. 5 illustrates the required phase change and the phase change imparted by a quarter wave zone plate made according to one embodiment of the present invention.

FIG. 5 illustrates the phase change imparted on incident radiation for one embodiment of the present invention. It can be seen that by reducing the diameter of the central zone 30', the phase change imparted by the second, third and fourth layers 20*a'*, 20*b'* and 20*c'* more closely follows the required phase change. In addition, a fifth layer provides a phase change 20*d'* at 360° thus providing a full 360° phase change over the complete wavelength zone.

Figure 6:
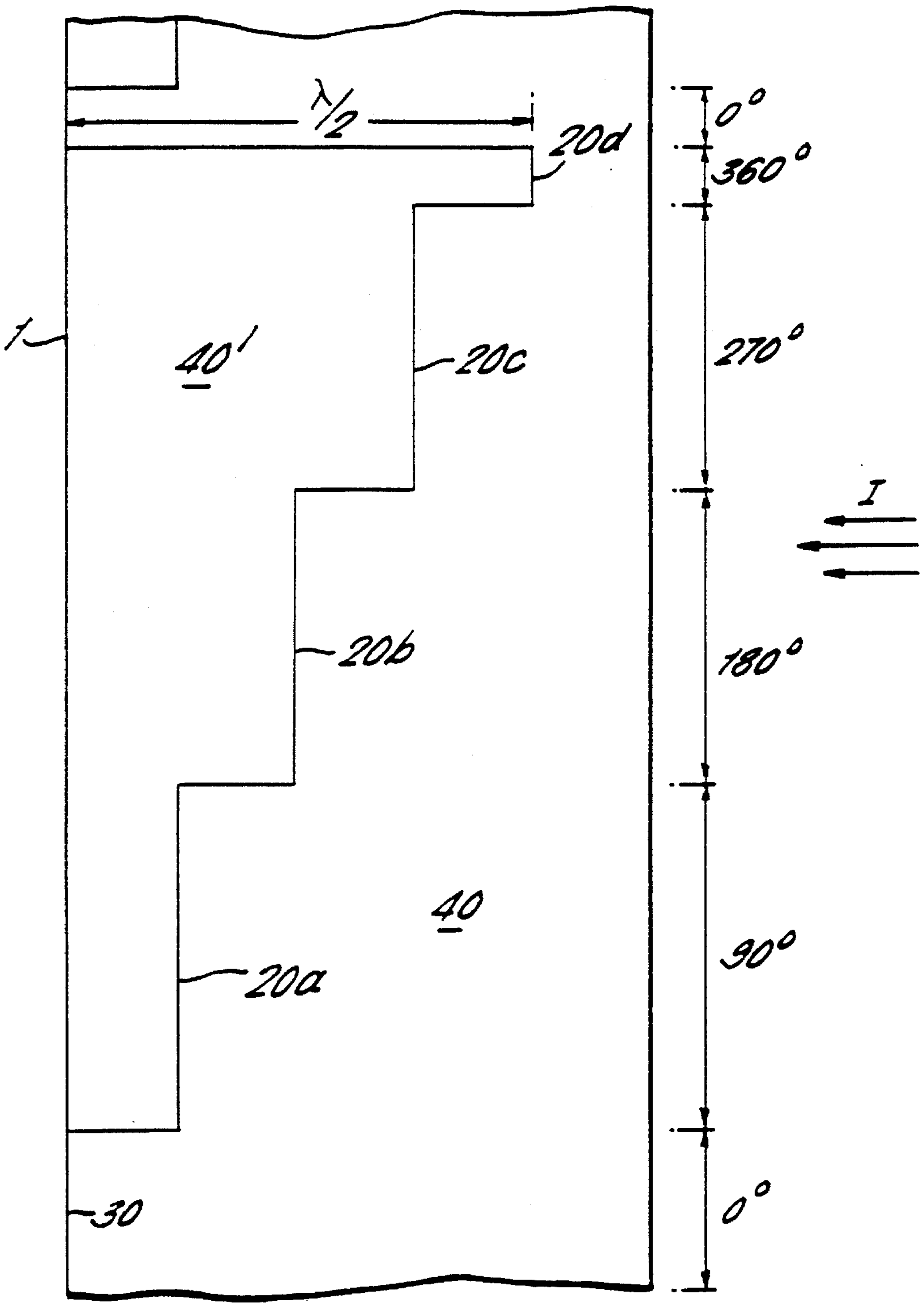
FIG. 6 illustrates the construction of the quarter wave zone plate, the phase diagram of which is given in FIG. 5.

FIG. 6 illustrates the structure of a zone plate providing the phase change illustrated in FIG. 5. In the zone plate 1 there are surfaces provided in five planes with surface portions lying therein. Only one complete wavelength zone is illustrated for simplicity. Since this is a reflective quarter wave zone plate, each of the planes is separated by λ/8, thus the first plane is separated from the fifth plane by λ/2. This provides for a 360° phase change between the first and fifth planes when the zone plate is used in reflection. In the reflective configuration the dielectric material 40 is provided in front of the reflective surface portions 30, 20*a*, 20*b*, 20*c*, and 20*d*.

For a transmission arrangement forming a Fresnel lens type zone plate, the separation of the planes needs to be λ/4 to give a total separation between the first and fifth planes of λ. In the transmission arrangement the dielectric material indicated by the reference numeral 40' would be provided behind the transmissive surface portions 30, 20*a*, 20*b*, 20*c*, and 20*d* forming the zones of the zone plate.

Figure 7:
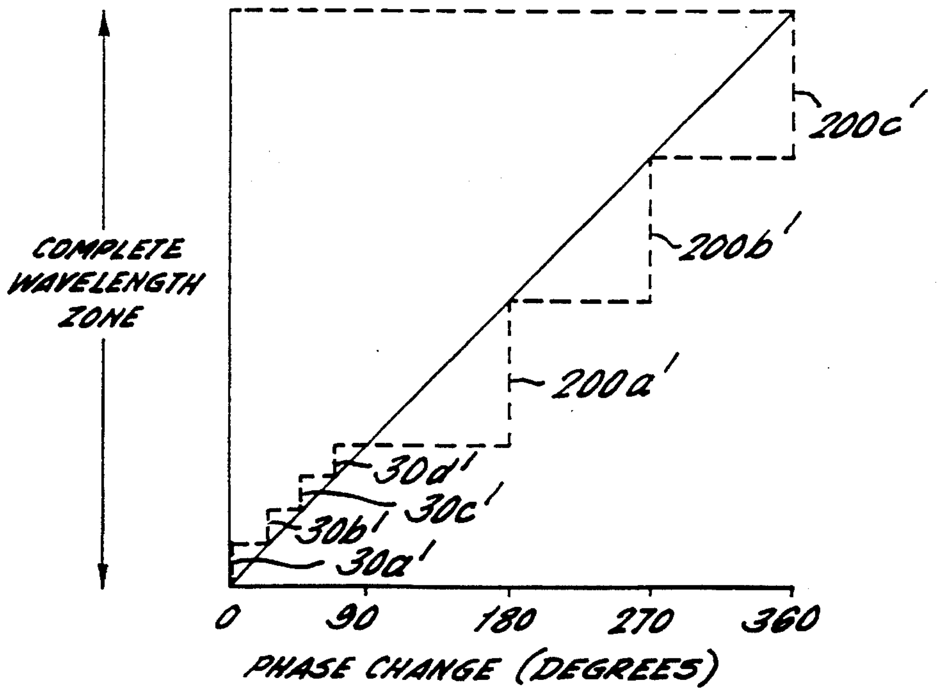
FIG. 7 illustrates the required phase change and the phase change imparted by a hybrid quarter wave and 16th wave zone plate according to a second embodiment of the present invention.

Referring now to FIG. 7, this illustrates a second embodiment of the present invention wherein the central zone of the quarter wave zone plate is further subdivided and phase retarded to provide the necessary phase correction to reduce the phase error normally provided by the conventional quarter wave zone plate. As illustrated in FIG. 7, the second, third and fourth surface portions forming normal quarter wave zones 200*a'*, 200*b'* and 200*c'* provide the normal phase shift. The central zone is subdivided into four sub-zones and phase retarded to better match the required phase change. Thus the sub-zones 30*a'*, 30*b'*, 30*c'*, and 30*d'* provide phase changes of 0°, 22.5°, 45° and 67.5° respectively.

Figure 8:
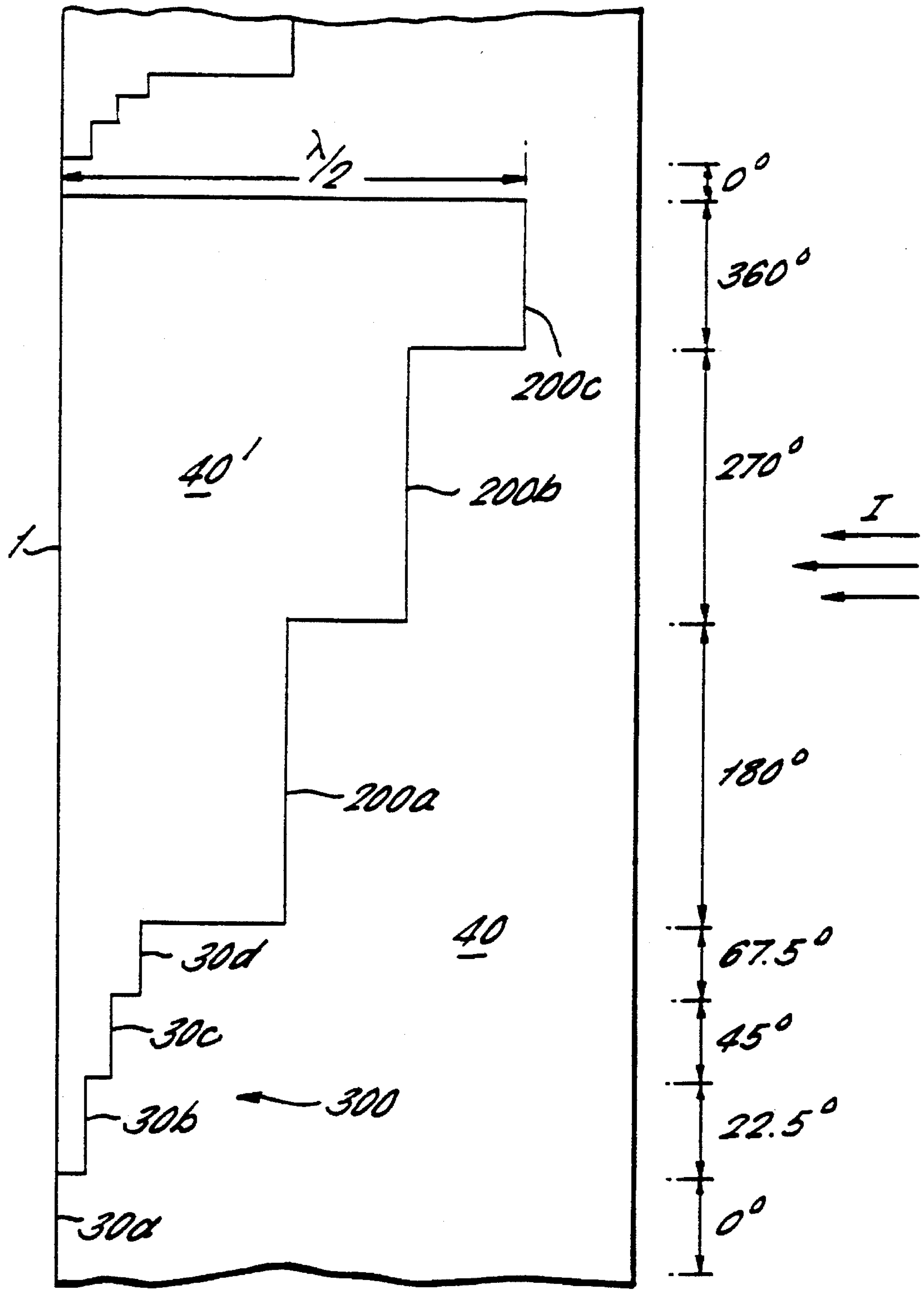
FIG. 8 illustrates the construction of a hybrid quarter wave and 16th wave zone plate for which the phase diagram is given in FIG. 7.

The construction of a quarter wave zone plate providing such a phase change is shown in FIG. 8. The zone plate 1 is provided with surface portions 200*a*, 200*b* and 200*c* in the third, fourth and fifth planes providing a 180°, 270° and 360° phase shifts respectively. The conventional central zone 300 has however been replaced with secondary surface portions 30*a*, 30*b*, 30*c*, 30*d* which correspond to 16th wave zones. Once again, this drawing illustrates a reflective zone plate wherein the dielectric material is placed in front of the reflective portions 30*a*, 30*b*, 30*c*, 30*d*, 200*a*, 200*b*, and 200*c*. Also, the primary reflective portions 200*a*, 200*b* and 200*c* and which form quarter wave zones of the zone plate are provided in parallel planes dielectrically separated by λ/8. The secondary surface portions 30*a*, 30*b*, 30*c* and 30*d* are dielectrically separated by λ/32 and lie in the first plane and sub-planes between the first and second planes.

The arrangement is equally applicable to a transmission arrangement wherein the planes will be dielectrically separated by λ/4 and the sub-planes λ/16, where the dielectric material 40' is placed behind the surface portions 30*a*, 30*b*, 30*c*, 30*d*, 200*a*, 200*b* and 200*c*.

To better approximate the required phase change, the primary surface portions 200*a*, 200*b* and 200*c* could also be subdivided into sub-zones in a similar manner to the central zone 300. If all of the primary surface portions 200*a*, 200*b* and 200*c* were subdivided, then this arrangement would, over the complete wavelength zone illustrated, form a 16th wave zone plate.

Because the surface portions forming zones of the zone plate gradually decrease in width nearer the edge of the zone plate, in order to simplify construction, the hybrid quarter wave and 16th wave zone plate can be constructed such that only the central zones are subdivided into 16th wave zones leaving the outer zones as quarter wave zones. In such an arrangement even if all of the zones are not subdivided, the rearmost zone will always benefit from being subdivided in order to provide a full 360° phase change at the edge of a complete wavelength zone.

Although the embodiments of the present invention have been described as providing a 360° phase change at the edge of a complete wavelength zone, the present invention is also applicable to zone plates having multiple wavelength zones, i.e. $n>1$ providing 360° phase change at the edge of the zone. In a quarter wave zone plate of this type the thickness of the zone plate will be greater, having $(4n+1)$ planes instead of 5 for a simple wavelength zone.

Thus the present invention is applicable to both reflection and transmission phase correcting zone plates. Such zone plates can be manufactured using such techniques as injection moulding or lamination of layers of dielectric material as disclosed in WO 92/01319, the contents of which are hereby incorporated by reference. For a reflection zone plate, the zone surfaces can be metallized either by metalising or by screen printing for example.

For microwave satellite communication applications, conveniently the zones of the zone plate are provided as ellipses since the radiation is to be focused off-axis. At the focal point of such a microwave antenna, there is provided a feed horn and LMB to collect the signal. For such applications the present invention provides a signal with less phase error than conventional zone plates.

Although one aspect of the present invention has been described by example wherein a 360° phase difference is provided between the edge of a wavelength zone, in another aspect of the present invention at least the central zone, and preferably several of the zones near the central zone are subdivided from for example $\lambda/4$ zones to $\lambda/16$ zones. Since the contribution to the signal at the focus from the zones further from the axis of the zone plate contribute less, the phase error remaining by not subdividing such zones is a small contribution. Also, since the diameter of the zones off-axis decrease significantly, manufacture of a zone plate is greatly simplified if only the central zones are subdivided to reduce phase error. FIG. 8 illustrates the subdivision of the central zone with an additional average phase retardation of 22.5°. Any or all of the surface portions 200*a*, 200*b* or 200*c* can be similarly subdivided, and not necessarily equally. Also surface portions of adjacent wavelength zones near the centre can also be subdivided.

What is claimed is:

1. A zone plate for focusing radiation, the zone plate comprising:

a plurality of reflective surface portions corresponding to zones of said zone plate; wherein said zone plate is a 1/L zone plate, and L is an integer greater than 2; said surface portions being positions in a plurality P of adjacent parallel planes from a first plane to a $P^{th}$ plane, where $P=nL+1$ and n is an integer; said surface portions being arranged in a plurality of groups, adjacent surface portions in each group being positioned in adjacent parallel plens to form a succession of adjacent surface portions from said first plane to said $P^{th}$ plane, so that each surface portion diffracts radiation out of phase with respect to adjacent surface portions such that radiation diffracted by said surface portions constructively interferes at a focus of said zone plate;

wherein the $P^{th}$ plane is dielectrically spaced from the first plane by $n\lambda/2$, where $\lambda$ is the wavelength of the radiation and n is an integer greater than zero, and the width of the surface portions provided in the first and $P^{th}$ planes is less than the width of the adjacent surface portions in adjacent second and $(P-1)^{th}$ planes respectively, the sum of the widths of a surface portion in the first plane of one group and a surface portion in the $P^{th}$ plane of an adjacent group is equal to a 1/L wave zone of said zone plate, and said surface portions in the first and $P^{th}$ planes diffract radiation in phase.

2. A zone plate as claimed in claim 1 wherein said surface portions in the first and $P^{th}$ planes each have a width corresponding to a ½L wave zone.

3. A zone plate as claimed in claim 1 wherein said surface portions comprise primary and secondary surface portions; the said primary surface portions each form 1/L wave zones of said zone plate, where L is an integer greater than 2, and are positioned in one of P parallel planes where $P=nL+1$, such that the primary surface portion in a plane diffracts radiation $m\lambda/L$ out of phase with respect to any primary surface portions in another plane, where m is an integer; said secondary surface portions are positioned in said planes and in sub-planes between said planes, a plurality r of said secondary surface portions being provided adjacent one another such that each secondary surface portion diffracts radiation $\lambda/Lr$ out of phase with respect to adjacent secondary surface portions, thus forming 1/Lr wave zones of said zone plate.

4. A zone plate as claimed in claim 3 wherein, of a group of r said secondary surface portions, one is positioned in a plane, and one is positioned in each of $(r-1)$ adjacent sub-planes.

5. A zone plate as claimed in claim 3 wherein no primary surface portions are provided in the first plane, there being a secondary surface portion in the first plane and each of $(r-1)$ sub-planes between the first and second planes.

6. A zone plate as claimed in claim 3 wherein said secondary surface portions are provided within the first wave zone of said zone plate only.

7. A zone plate as claimed in claim 3 wherein said planes are dielectrically separated by $\lambda/2L$ and said sub-planes are dielectrically separated by $\lambda/2Lr$.

8. A zone plate for focusing radiation comprising a plurality of surface portions corresponding to zones of said zone plate; said surface portions comprise primary and secondary surface portions; said primary surface portions are positioned in a plurality L of parallel planes so that each primary surface portion diffracts radiation $m\lambda/L$ out of phase with respect to other primary surface portions such that radiation diffracted by said surface portions constructively interferes at a focus of said zone plate, where m is an integer greater than zero and $\lambda$ is the wavelength of the radiation; said secondary surface portions are provided in at least the central zone of said zone plate in a said plane and sub-planes, and wherein a plurality r of said secondary surface portions are provided adjacent one another such that each secondary surface portion diffracts radiation $\lambda/Lr$ out of phase with respect to adjacent secondary surface portions, thus forming 1/Lr wave zones of said zone plate.

9. A zone plate as claimed in claim 8, wherein no primary surface portions are provided in the first plane, there being a secondary surface portion in the first plane and each of (r–1) sub-planes positioned on a side of the first plane distal from the second plane.

10. A zone plate as claimed in claim 8 wherein said surface portions are reflective and said planes are dielectrically separated by $\lambda/2L$ and said sub-planes are dielectrically separated by $\lambda/2Lr$.

11. A zone plate as claimed in claim 8 wherein said surface portions are transmissive, and said zone plate is formed of dielectric material through which the radiation passes to be focused; said planes are dielectrically separated by $\lambda/L$, and said sub-planes are dielectrically separated by $\lambda/Lr$.

12. A zone plate for focusing radiation, the zone plate comprising:

a plurality of transmissive surface portions corresponding to zones of said zone plate; wherein said zone plate is a 1/L zone plate and L is an integer greater than 2; said surface portions are positioned in a plurality P of adjacent parallel planes from a first plane to a $P^{th}$ plane, where P=nL+1 and n is an integer, said surface portions being arranged in a plurality of groups, adjacent surface portions in each group being positioned in adjacent parallel planes to form a succession of adjacent surface portions from said first plane to said $P^{th}$ plane, so that each surface portion diffracts radiation out of phase with respect to adjacent surface portions such that radiation diffracted by said surface portions constructively interferes at a focus of said zone plate;

wherein the $P^{th}$ plane is dielectrically spaced from the first plane by $n\lambda$, where $\lambda$ is the wavelength of the radiation and n is an integer greater than zero, and the width of the surface portions provided in the first and $P^{th}$ planes is less than the width of the adjacent surface portions in adjacent second and $(P-1)^{th}$ planes respectively, the sum of the widths of a surface portions in the first plane of one group and a surface portion in the $P^{th}$ plane of an adjacent group are equal to a 1/L wave zone of said zone plate, and said surface portions in the first and $P^{th}$ planes diffract radiation in phase.

13. The zone plate as claimed in claim 12 wherein said surface portions in the first and $P^{th}$ planes each have a width corresponding to a ½L wave zone.

14. The zone plate as claimed in claim 12 wherein said surface portions comprise primary and secondary surface portions; the said primary surface portions each form 1/L wave zones of said zone plate, where L is an integer greater than 2, and are positioned in one of P parallel planes where P=nL+1, such that each primary surface portion in a plane diffracts radiation $m\lambda/L$ out of phase with respect to any primary surface portions in another plane, where m is an integer; said secondary surface portions are positioned in said planes and in sub-planes between said planes, and wherein a plurality r of said secondary surface portions are provided adjacent one another such that each secondary surface portion diffracts radiation $\lambda/Lr$ out of phase with respect to adjacent secondary surface portions, thus forming 1/Lr wave zones of said zone plate.

15. The zone plate as claimed in claim 14 wherein of a group of r said secondary surface portions one is positioned in a plane, and one is positioned in each of (r–1) adjacent sub-planes.

16. The zone plate as claimed in claim 14 wherein no primary surface portions are provided in the first plane, there being a secondary surface portion in the first plane and each of (r–1) sub-planes between the first and second planes.

17. The zone plate as claimed in claim 14 wherein said secondary surface portions are provided within a first wave zone of said zone plate only.

18. The zone plate as claimed in claim 14 wherein said zone plate is formed of dielectric material through which the radiation passes to be focused; said planes are dielectrically separated by $\lambda/L$, and said sub-planes are dielectrically separated by $\lambda/Lr$.

* * * * *

UNITED STATES PATENT AND TRADEMARK OFFICE

CERTIFICATE OF CORRECTION

PATENT NO. : 5,486,950

DATED : January 23, 1996

INVENTOR(S) : Gary Collinge

It is certified that error appears in the above-indentified patent and that said Letters Patent is hereby corrected as shown below:

Claim 1, line 64, cancel "positions" and insert --positioned--;

Claim 1, line 3, cancel "plens" and insert --planes--.

Signed and Sealed this

Eighteenth Day of March, 1997

Attest:

BRUCE LEHMAN

*Attesting Officer* *Commissioner of Patents and Trademarks*